Patented July 24, 1951

2,561,427

UNITED STATES PATENT OFFICE 2,561,427

LINOLEUM COMPOSITIONS

Warren Stubblebine, Lancaster, Pa., assignor to Armstrong Cork Company, Lancaster, Pa., a corporation of Pennsylvania No Drawing. Application March 15, 1947, Serial No. 735,027

14 Claims. (Cl. 260—23)

This invention or discovery relates to linoleum compositions, and it comprises a linoleum composition which includes a hydrolyzed copolymer of vinyl chloride and vinyl acetate; all as more fully hereinafter set forth and as claimed.

The cements or binders used in making linoleum are well-known and contain a characteristic substance prepared by thickening or bodying a drying oil or a semi-drying oil, hereinafter referred to as a siccative oil, by polymerization induced by heat, by an oxidation process or both by heat and oxidation. There are various well-known ways of preparing the polymerized oil used in the manufacture of linoleum. Polymerization of the siccative oil can be obtained by simply heating the oil to a high temperature in the order of 500° F. for a number of hours, generally 12 hours or longer. The resulting cement is known as "Taylor oil cement." The preparation of "Taylor oil" is described in British Patent No. 2,057 of 1871. Polymerization can also be obtained by exposing the oil to air to effect both polymerization and oxidation. When the oxidation and polymerization are effected by trickling the oil over hanging sheets of scrim cloth, the product is known as "scrim or shed oil." Such a process is disclosed in British Patents 209/1860 and 1,037/1863 to Frederick Walton, the inventor of linoleum. When the oil is prepared by blowing air through a quantity of oil in an oxidizer, the product is known as "mechanical oil." A process of this sort is disclosed in British Patent No. 7,742 of 1893 to Wood-Bedford and is sometimes referred to as the Wood-Bedford process. In all of these processes, a semi-solid plastic mass or siccative oil gel results.

Taylor oil cement is often used in the condition it comes from the kettle without the addition of resin. With scrim or shed oil and with mechanical oil, common practice is to incorporate a resin with the polymerized siccative oil gel. In one method, the resin is charged with the oil into the mechanical oxidizer and the polymerization and oxidation is effected in the presence of the resin. This results in a siccative oil-resin gel cement as discharged from the oxidizer.

Where scrim or shed oil is used or when mechanical oil is employed, common practice is to add the resin to the siccative oil gel by the use of a heated mixer to form a siccative oil-resin gel.

Where a resin is used as part of the cement, it may be any naturally occurring resin, fossil resin, or synthetic resin, or a combination of such resins. Rosin, ester gum, kauri gum, copal, alkyd resin, rosin modified phenol-aldehyde resin, phenol-aldehyde resin, and the like, or mixtures thereof may be used. Rosin is at present the most widely used resin. All such resin-containing linoleum cements, regardless of when or how the resin is incorporated, are properly termed "siccative oil-resin gel" and are also included in the more generic term "siccative oil gel."

Ordinarily, linoleum cements comprise 65 to 85% by weight of siccative oil and about 15 to 35% by weight of resin. The drying oil most commonly employed is linseed oil, and other oils such as soya bean oil, menhaden oil, perilla oil, rapeseed oil, China-wood oil, and the like, or mixtures thereof, may be used. If desired, these drying oils may be modified by the addition of suitable reagents, such as tall oil, tall oil esters, and the like, in various amounts, depending upon the specific oil. The product known in the art as linoleum composition is prepared by admixing the linoleum cement with suitable fillers, such as cork, wood flour, mineral fillers, pigments, and the like, and thereafter forming the mix into a sheet. Normally, the mix is applied to a backing, such as burlap, saturated felt, cotton fabric, or the like, and is consolidated thereon by calendering or by heated platen presses. In some instances, the backing is omitted. Generally speaking, the linoleum composition which may or may not be applied to a backing comprises 30% to 40% cement or binder and 60% to 70% filler.

In all cases, it is necessary that the product after consolidation undergo a further heating process to render it sufficiently hard and resistant to be commercially serviceable. This process must be carried out after mixing and consolidation has been effected and is usually accomplished by hanging the lineoleum composition in a heated stove or oven. Maturing may be accomplished at about 175° F. and about 30 days for ¼" thicknesses. This is an expensive operation involving a large investment in stoves and, as mentioned above, requires considerable time.

As hereinafter used, the term "linoleum composition" shall include both the matured and nonmatured admixtures of linoleum cement and filler ingredients.

Various ingredients have been added to linoleum compositions for the purpose of accelerating the maturing of the linoleum mix. Among the materials which have proved to be fairly efficient accelerators for linoleum compositions have been certain condensation products of formaldehyde with certain phenols and cresols which, when added in small amounts to the linoleum compositions, result in a reduction in the time required to mature the linoleum mix. However, the condensation products heretofore used as accelerators in linoleum compositions possess the decided disadvantage of decomposing at the maturing temperatures employed resulting in the formation of highly volatile compounds which are liberated and, therefore, their presence in the stoves and in the mix is a definite health hazard. Further, because of this tendency to decompose, these condensation products sometimes show no appreciable effect upon the maturing of the mix at the temperatures at which the linoleum is matured, that is, temperatures of about 160° F. to about 180° F., because the phenols and cresols liberated are recognized antioxidants and their presence in the stoves prevents to some degree the maturing of the siccative oils in the mix. Another disadvantage resulting from the employment of these particular condensation products in that they tend to discolor the final product.

I have found that linoleum compositions may be prepared containing a hydrolyzed copolymer of vinyl chloride and vinyl acetate. The incorporation of hydrolyzed vinyl chloride-vinyl acetate copolymer in linoleum compositions results in a decided reduction in the maturing time of the composition. Furthermore, linoleum manufactured from compositions containing hydrolyzed vinyl chloride-vinyl acetate copolymers is characterized by increased resiliency, increased water resistance, increased alkali resistance, and increased flexibility and toughness. The incorporation of hydrolyzed vinyl chloride-vinyl acetate copolymer resins into linoleum compositions may be accomplished in the usual type of internal mixer, and the resulting composition calendered in the usual manner.

While a variety of copolymers of vinyl chloride and vinyl acetate may be employed in the practice of my invention, the material described below gives particularly advantageous results. This material may be advantageously prepared by subjecting a mixture containing approximately 90% vinyl chloride and approximately 10% vinyl acetate to polymerization conditions to produce a copolymer of vinyl chloride and vinyl acetate. Generally speaking, the conditions are such as to result in the production of a copolymer having a molecular weight of approximately 49,000. After preparing the copolymer as indicated above, a portion of the acetate groups is hydrolyzed to hydroxyl groups. Advantageous results are obtained by the practice of my invention with vinyl chloride-vinyl acetate copolymers which have been hydrolyzed under such conditions as to replace 20% to 50% of the acetate groups with hydroxyl groups. Particularly advantageous results have been obtained with vinyl chloride-vinyl acetate resins in which 20% to 30% of the acetate groups have been hydrolyzed. Hydrolyzed vinyl chloride-vinyl acetate copolymer resins, which may be employed in the practice of my invention, are soluble in acetone and a 20% solution of butanol in xylol. These resins are not soluble in siccative oils such as linseed oil, soya bean oil, and the like, or mixtures of such oils, but they are compatible with oxidized and polymerized linseed oil-resin gel and soya bean oil-resin gel, such as are contained in linoleum cement. A hydrolyzed vinyl chloride-vinyl acetate copolymer resin which is typical of the hydrolyzed resins described above is that obtainable from the Bakelite Corporation under the designation "Vagh."

In practicing my invention, a small but effective amount of a hydrolyzed vinyl chloride-vinyl acetate copolymer may be added to the linoleum cements known in the art. The compositions thus prepared may then be mixed with any of the well-known filling materials such as cork, wood flour, and the like, pigments and other materials regularly employed in the manufacture of linoleum. The hydrolyzed copolymer may be first added to the siccative oil gel followed by the addition of the usual pigments and fillers. If desired, the hydrolyzed copolymer may be blended with the siccative oil-rein gel in an internal mixer or a two-roll mill as a master batch, aliquots of which may then be charged to a second mixer in which the balance of the cement, together with filler and color pigment, is incorporated. Also, a mix of siccative oil gel, pigments and fillers may be first formed, and then the hydrolyzed copolymer may be added. The order of mixing is not critical as long as the drying oil has undergone the original processing stage, that is, a treatment according to the scrim process or similar processes well known to the art. The linoleum mix containing hydrolyzed copolymers may then be calendered or otherwise deposited upon a suitable backing. Linoleum mixes containing the cement of my invention are matured at a greater saving of time than are the linoleum mixes which contain the cements of the prior art. The matured product is characterized by increased resiliency, increased water resistance, increased alkali resistance, increased flexibility, and increased toughness. Although the linoleum compositions of my invention are by no means limited to the proportion of hydrolyzed copolymer added, it is advantageous that the accelerator be present in small but effective amounts such as 3% to about 20% of the weight of the linoleum cement. Should less than 3% of the hydrolyzed copolymer be employed in the composition, no substantial improvement in the final product is obtained. The use of more than 20% of hydrolyzed copolymer offers no substantial improvement over products containing 20% hydrolyzed copolymer. The use of about 3% to 12% hydrolyzed copolymer in cement results in the production of a linoleum which matures rapidly and is characterized with high resistance to water and alkali, as well as high flexibility and toughness.

The following examples, in which all proportions given are by weight, illustrate various specific embodiments of my invention. These examples are given merely by way of illustration and not by way of limitation.

*Example I*

| | Per cent |
|---|---|
| Oxidized and polymerized linseed oil-rosin gel | 34 |
| Hydrolyzed vinyl chloride-vinyl acetate copolymer | 2 |
| Filler | 64 |

*Example II*

| | Per cent |
|---|---|
| Oxidized and polymerized soya bean oil-rosin gel | 33 |
| Hydrolyzed vinyl chloride-vinyl acetate copolymer | 3.7 |
| Filler | 64.3 |

*Example III*

| | Per cent |
|---|---|
| Oxidized and polymerized soya bean oil | 32 |
| Hydrolyzed vinyl chloride-vinyl acetate copolymer | 5.6 |
| Filler | 62.4 |

The use of linoleum compositions as described herein greatly reduces the time required to completely mature the linoleum and thereby results in valuable savings in time and materials in the linoleum-making process. For instance, the maturing time of linoleum mixes containing hydrolyzed vinyl chloride-vinyl acetate copolymers may be as much as 60% less than the time required for maturing normal linoleum compositions.

In addition to reducing the maturing time and improving the alkali resistance, water resistance, flexibility, and toughness of linoleum compositions prepared from cements or binders resulting from the oxidation and polymerization of linseed oil, the presence of hydrolyzed vinyl chloride-vinyl acetate copolymers in compositions prepared from soya bean oil results in marked improvement in properties of materials containing oxidized and polymerized soya bean oil. Although soya bean oil has been heretofore employed in the manufacture of linoleum compositions, such compositions have heretofore resulted in materials which are somewhat less desirable than those materials prepared from linseed oil. In other words, these compositions do not possess physical properties which are comparable to the physical properties of linoleum prepared from linseed oil-rosin cement. In addition, the maturing time of linoleum compositions containing soya bean oil gel has, heretofore, been so long as to make the production of linoleum therefrom an unusually slow process. I have found that the use of hydrolyzed vinyl chloride-vinyl acetate copolymers in compositions containing soya bean oil cements results in such a reduction in maturing time as to make the product competitive from the point of view of production time with compositions containing other siccative oil gels and, in addition, results in products, the physical properties of which equal or surpass the materials prepared from linseed oil cements.

The results of various tests made upon hydrolyzed vinyl chloride-vinyl acetate copolymer reinforcing soya bean linoleum are given in the table below in which linoleum composition containing linseed oil-rosin gel cement is compared with soya bean oil linoleum containing 1.8%, 3%, and 5%, hydrolyzed copolymer.

*Table*

| Test | Straight Linseed | 1.8% | 3% | 5% |
|---|---|---|---|---|
| Initial Penetration | 42.1 | 41.1 | 40.9 | 45.8 |
| Residual Indentation | 22.6 | 17.0 | 18.4 | 20.9 |
| Spot Alkali | +41.8 | +12.9 | +15.8 | +16.7 |
| Sandpaper Abrasion | 1.53 | 1.54 | 1.55 | 1.63 |
| Olsen Stiffness: | | | | |
| 1 M. D. | 4.1 | 3.9 | 3.9 | 3.7 |
| 2 A. M. D. | 3.0 | 3.0 | 3.3 | 2.7 |
| 3 M. D. degrees | 45 | 55 | 59 | 67 |
| 4 A. M. D. do | 53 | 64 | 56 | 80 |
| H₂O Immersion | 4.41 | 3.87 | 3.64 | 4.11 |
| Alkali Abrasion | 3.48 | 1.06 | 1.16 | .97 |
| Static Load: | | | | |
| 1 | 13.8 | 2.6 | 9.5 | 10.1 |
| 2 | 13.0 | .87 | 7.9 | 9.0 |
| 3 | 13.0 | .87 | 7.9 | 8.2 |

In the indentation test, a disc of the covering material is supported upon a steel plate and 150 pounds' pressure is applied to a flat-ended cylindrical steel bar 0.178" in diameter, and the resulting force applied to the upper surface of the sample for a period of 30 seconds. The load is lowered gently until the bar is in full contact with the sample and the sample in full contact with the plate. After 30 seconds, the load is quickly and completely removed. The penetration of the bar into the sample at the end of the 30 seconds' application of pressure is measured and is known as the initial penetration. This is reported as per cent of the original thickness. Fifteen minutes after removal of the load, the residual indentation is measured to the nearest .001" and calculated as percentage of the original thickness. This percentage figure is known as the per cent of residual indentation.

In the spot alkali test, two 1 square inch areas of the material under test are marked adjacent to one another. On one of the areas, an initial penetration test is made, as described above, using 150 pounds on a 0.178" diameter flat tip for 30 seconds, and the per cent initial penetration is calculated. To the other area is applied approximately 1 cc. of a 2% solution of NaOH which is allowed to remain in contact with the surface for 30 minutes. The alkaline solution is removed by washing with tap water and blotted dry. The exposed area is then allowed to dry for 3 to 5 minutes. An initial penetration test is then performed on area exposed to the alkaline solution using the same conditions, and the per cent initial penetration is calculated. The difference in per cent initial penetration between the unexposed area and the alkali-treated area is then calculated and reported as the per cent change in initial penetration due to alkali.

The sandpaper abrasion test was conducted on the device and in accordance with the method described in "A new sandpaper abrasion tester" appearing at page 23 of the December, 1946, issue of the ASTM Bulletin. In accordance with this test, the sample was subjected to 68 revolutions while exposed to a No. OE sandpaper applied at 30 pounds' pressure. The results are reported as loss in cc.

The Olsen stiffness tests were conducted on a Tinius-Olsen 50 inch pound capacity test machine using 2 inch wide samples and a 1" span. This testing machine is commonly used in the testing of wire, tinplate, felt, and other materials. The designation M. D. stands for machine direction; whereas, the designation A. M. D. stands for across machine direction. The results given in rows 1 and 2 under this item recite bending force in inch pounds at 20° bend. The results given in rows 3 and 4 of this item set forth the bend-break angle in degrees.

The water immersion results given in the table were obtained by conditioning a 4" x 2" sample 24 hours in a constant temperature room, weighing the sample to the nearest .01 gram, and immersing the sample on end under 1" head of water maintained at 70° F. After 24 hours, the sample was removed from the water, the excess water blotted, and the sample was reweighed. The per cent gained in weight is set forth in the table.

The alkali abrasion test, the results of which are given in the table, was carried out by conditioning the sample and subjecting the sample to the action of a charge of sand and steel balls in a drum containing 5% sodium hydroxide solution. After wearing, the sample was washed and placed in a control cabinet at 195° F. overnight, together with a control sample which had not been abraded. The samples were removed from the cabinet and placed in a desiccator over calcium chloride for 20 hours at 70° F. The weight loss in grams set forth in the table was determined by subtracting the weight of the abraded sample from the weight before subjection to abrasion. This value was then corrected by the weight loss in the control sample as a result of drying alone.

In the static load test, the sample was subjected to the action of 635 pounds on a 1 square inch area for 5 days. The original thickness minus the sample thickness after the removal of the load was measured and the difference calculated as per cent residual indentation. The results given in row 1 of this item were determined immediately after removal of the load. The results given in row 2 of this item were determined 15 minutes after removal of the load. The results given in row 3 of this item were determined 1 hour after removal of the load.

It can be seen from the results set forth in the table that the addition of small but effective amounts of hydrolyzed copolymer to linoleum compositions containing soya bean oil-resin gels improves the characteristics of the compositions so that the compositions are equal to or better than standard linoleum compositions containing linseed oil cement.

The linoleum compositions of my invention are particularly suitable for use in the manufacture of floor coverings which may be manufactured in such gauges as .0725'' to $3/16''$. The compositions are also suitable for use in the manufacture of wall coverings, desk tops, sink tops, and the like.

While my invention has been described with reference to certain particular embodiments and with reference to certain specific examples, it is to be understood that the invention is not limited thereby. Therefore, changes, omissions, substitutions and/or additions may be made without departing from the spirit of the invention as defined in the appended claims which are intended to be limited only as required by the prior art.

I claim:

1. A linoleum composition comprising an oxidized and polymerized siccative oil-resin gel, a filler, and 3% to 20% by weight based on said gel of the product resulting from the hydrolysis of 20% to 30% of the acetate groups of a vinyl chloride-vinyl acetate copolymer containing about 10% vinyl acetate.

2. A linoleum composition comprising an oxidized and polymerized drying oil-resin gel, a filler, and 3% to 20% by weight based on said gel of a hydrolyzed copolymer of vinyl chloride and vinyl acetate containing about 10% vinyl acetate of which 20% to 50% of the acetate groups have been hydrolyzed.

3. A linoleum composition comprising an oxidized and polymerized semi-drying oil-resin gel, a filler, and 3% to 20% by weight of said gel of a vinyl chloride-vinyl acetate copolymer containing about 10% vinyl acetate and having 20% to 50% of its acetate groups replaced by hydroxyl groups.

4. A linoleum composition comprising an oxidized and polymerized siccative oil-resin gel, a filler, and 3% to 12% by weight of said gel of the product resulting from the hydrolysis of 20% to 30% of the acetate groups of a vinyl chloride-vinyl acetate copolymer containing about 10% vinyl acetate.

5. A linoleum composition comprising a linseed oil-rosin gel, a filler, and 3% to 20% by weight of said gel of the product resulting from the hydrolysis of 20% to 30% of the acetate groups of a vinyl chloride-vinyl acetate copolymer containing about 10% by weight vinyl acetate.

6. A linoleum composition comprising an oxidized and polymerized soya bean oil-resin gel, a filler, and 3% to 20% by weight of said gel of the product resulting from the hydrolysis of 20% to 30% of the acetate groups of a vinyl chloride-vinyl acetate copolymer containing about 10% by weight vinyl acetate.

7. A floor covering having a base layer to which is applied a wearing surface including an oxidized and polymerized siccative oil gel, a filler, and 3% to 20% by weight based on said gel of a hydrolyzed copolymer of vinyl chloride and vinyl acetate containing about 10% vinyl acetate of which 20% to 50% by weight of the acetate groups have been hydrolyzed.

8. A floor covering comprising a wearing surface which includes an oxidized and polymerized siccative oil gel, a filler, and 3% to 20% by weight of said gel of a hydrolyzed copolymer of vinyl chloride and vinyl acetate containing about 10% vinyl acetate of which 20% to 50% by weight of the acetate groups have been hydrolyzed, said wearing surface being applied to a burlap backing.

9. A felt base floor covering the wearing surface of which comprises an oxidized and polymerized siccative oil gel, a filler, and 3% to 20% by weight of said gel of a hydrolyzed copolymer of vinyl chloride and vinyl acetate containing about 10% vinyl acetate of which 20% to 50% by weight of the acetate groups have been hydrolyzed.

10. A linoleum cement comprising an oxidized and polymerized siccative oil gel, and 3% to 20% by weight of said gel of a hydrolyzed copolymer of vinyl chloride and vinyl acetate containing about 10% vinyl acetate of which 20% to 50% by weight of the acetate groups have been hydrolyzed.

11. A linoleum cement comprising an oxidized and polymerized linseed oil-resin gel, and 3% to 20% by weight of said gel of the product resulting from the hydrolysis of 20% to 50% of the acetate groups of a vinyl chloride-vinyl acetate copolymer containing about 10% vinyl acetate.

12. A linoleum cement comprising an oxidized and polymerized soya bean oil-resin gel, and 3% to 20% by weight of said gel of the product resulting from the hydroylsis of 20% to 50% of the acetate groups of a vinyl chloride-vinyl acetate copolymer containing about 10% vinyl acetate.

13. A lineoleum cement comprising an oxidized and polymerized linseed oil-rosin gel, and 3% to 12% by weight of the product resulting from the hydrolysis of 20% to 30% of the acetate groups of a vinyl chloride-vinyl acetate copolymer containing about 10% by weight vinyl acetate.

14. A linoleum cement comprising an oxidized and polymerized soya bean oil-rosin gel containing 3% to 12% by weight of the product resulting from the hydrolysis of 20% to 30% of the acetate groups of a vinyl chloride-vinyl acetate copolymer containing about 10% vinyl acetate.

WARREN STUBBLEBINE.

REFERENCES CITED

The following references are of record in the file of this patent:

UNITED STATES PATENTS

| Number | Name | Date |
|---|---|---|
| 2,426,316 | Martin | Aug. 26, 1947 |
| 2,428,282 | Kemmler | Sept. 30, 1947 |

Certificate of Correction

Patent No. 2,561,427                                                      July 24, 1951

WARREN STUBBLEBINE

It is hereby certified that error appears in the printed specification of the above numbered patent requiring correction as follows:

Column 2, line 33, for "lineoleum" read *linoleum*; column 4, line 2, for "rein" read *resin*; column 7, line 66, for "resin" read *rosin*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*